United States Patent [19]
Liss

[11] 3,806,793
[45] Apr. 23, 1974

[54] MEANS FOR MEASURING THE DELAY ANGLE IN A STATIC CONVERTER

[75] Inventor: Göte Liss, Ludvika, Sweden

[73] Assignee: Allmanna Svenska Elektriska Aktiebolaget, Vasteras, Sweden

[22] Filed: May 2, 1973

[21] Appl. No.: 356,488

[30] Foreign Application Priority Data
May 3, 1972 Sweden.................................. 5788/72

[52] U.S. Cl..................... 321/40, 321/27 R, 321/38
[51] Int. Cl. ............................................ H02m 7/46
[58] Field of Search ............ 321/4, 5, 13, 27 R, 38, 321/40, 42

[56] References Cited
UNITED STATES PATENTS
3,551,778  12/1970  Ekstrom................................ 321/5
3,704,408  11/1972  Schroeder............................. 321/5
3,766,465  10/1973  Reeve................................... 321/5

*Primary Examiner*—William H. Beha, Jr.
*Attorney, Agent, or Firm*—Jennings Bailey, Jr.

[57] ABSTRACT

For measuring the delay angle in a static converter, a ramp-function generator is provided for each rectifier phase connected to the alternating current network. The ramp-function generator includes a timing device responsive to passage through zero of the commutation voltage derived from the network, and a connecting member which connects the ramp-function generator to a sensing and holding circuit. The connecting member is controlled by the control pulse device of the converter so that the signal stored in the sensing and holding circuit at any moment corresponds to the delay angle for the rectifier last ignited.

3 Claims, 4 Drawing Figures

MEANS FOR MEASURING THE DELAY ANGLE IN A STATIC CONVERTER

BACKGROUND OF THE INVENTION

1. Field of the Invention

The present invention relates to a means for measuring the delay angle of the rectifiers in a static converter connected to an alternating current network.

2. The Prior Art

The invention thus relates to a so-called network-commutating converter in which the commutation voltage for the rectifiers is derived from the alternating current network. The rectifiers in the converter are controlled by a control system having a delay angle determined either by a regulator for current, power or the like, or by a limit value transducer, for example a commutation margin control device.

The direct voltage arising in the converter is defined by the expression $E \cdot \cos\alpha$ where $E$ is the value of the alternating voltage connected to the rectifiers and $\alpha$ is the delay angle. In order to limit the reactive power in the converter it is desirable in rectifier or inverter operation to keep $\alpha$ as close to 0° or 180° as is practically possible and convenient and in order to achieve this at a desired direct voltage value, it is usual to provide the converter transformer with a tap changer to vary the voltage $E$ depending on the real value of the delay angle $\alpha$.

However, in more modern control systems oscillators are often used which emit control pulses to the rectifiers with a certain frequency. Thus, the signal from the control system becomes merely an order to alter the delay angle in one direction or the other whereas, during stationary operation, this signal becomes zero and the value of the delay angle is substantially unknown.

SUMMARY OF THE INVENTION

The present invention relates to a relatively simple device for measuring the delay angle and the measurement takes place from the zero passages of the commutation voltages and the control pulses of the rectifier and the device is constituted by a ramp-function generator for each rectifier phase of the current converter which includes a timing device responsive to the passage through zero of the commutation voltage and a sensing and holding circuit connected to the ramp-function generator by a connecting member which is controlled by the control pulse device of the converter so that the signal stored in the sensing and holding circuit at any moment corresponds to the delay angle for the rectifier last ignited. According to the invention a new measuring value for the delay angle is obtained immediately after each commutation so that the device is as rapid as possible in operation.

It is also important to be able to sense the delay angles when there are several cooperating converters in a converter station, controlled according to the oscillator principle. The regulator can then give collected orders to the various converters without it being at all clear how the orders are distributed between or carried out by the various converters. By measuring the delay angles, the invention makes it possible to counterbalance the deviations in the delay angles, and thus the power distribution over the various converters.

BRIEF DESCRIPTION OF THE DRAWING

The invention will be further described with reference to the accompanying drawings in which FIG. 1 shows a converter of conventional design, whereas

DESCIPTION OF THE PREFERRED EMBODIMENTS

Figure 1:
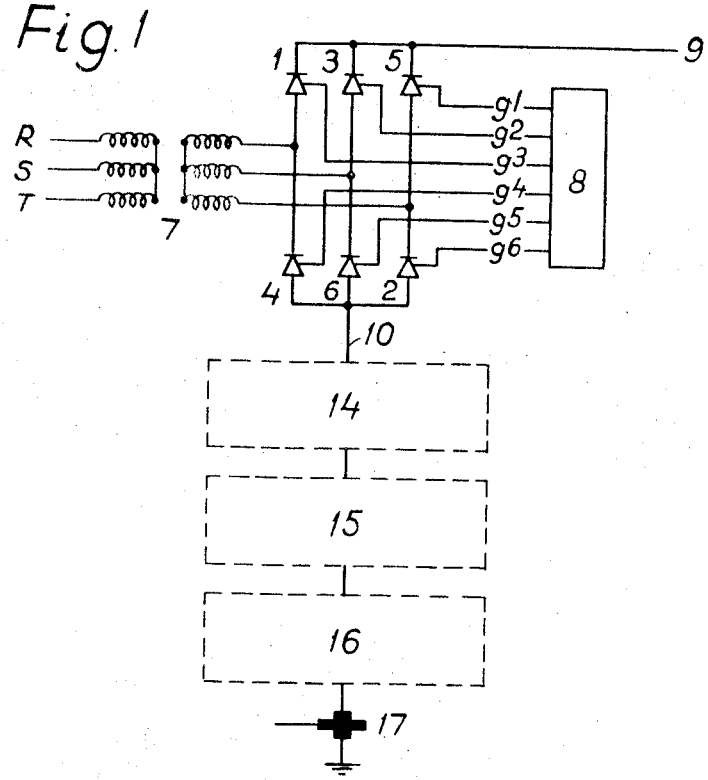

FIG. 1 shows a converter having a rectifier bridge with six rectifiers 1 – 6 and a converter-transformer 7. The converter is connected to an alternating current network by phase conductors RST and to DC busbars 9, 10. The rectifiers 1 – 6 are controlled by a control device 8 of conventional type, which emits control signals $g_1 - g_6$ to the rectifiers.

The control device 8 is of the oscillator type, for example according to U.S. Pat. No. 3,551,778, which, depending on the frequency of the AC network, delivers control pulses the phase position of which can be altered in one direction or the other by a regulator without the phase angle, that is the delay angle, of the control pulses ever appearing as an available parameter or magnitude in the control system.

The means for measuring the delay angles reached by the control signals $g_1 - g_6$ is shown more clearly in FIG. 2 and its function will be explained with reference to FIG. 3.

Figure 2:
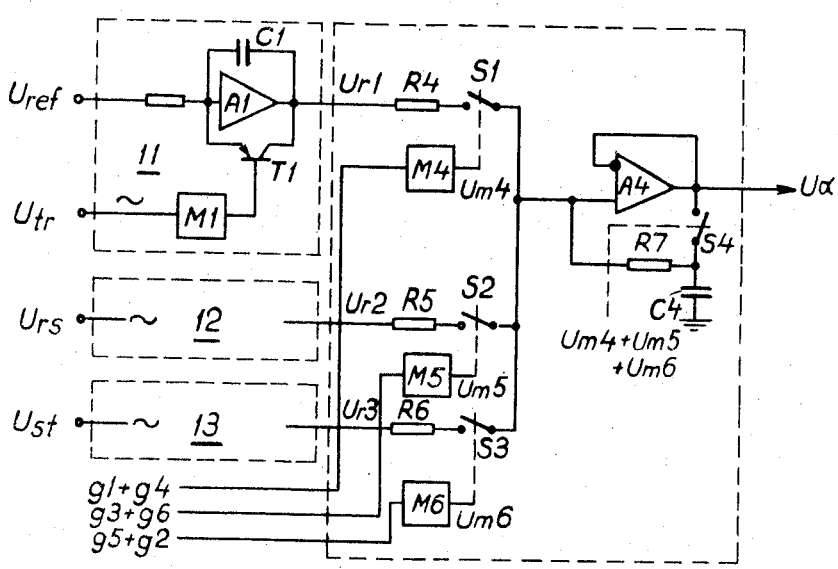
FIG. 2 shows a device according to the invention.
Figure 3:
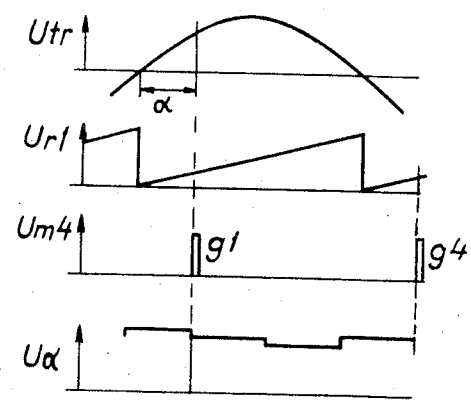
FIG. 3 shows the various voltages which arise in such a device.

To the left in FIG. 2 are three ramp-function generators 11, 12, 13 which derive three saw-tooth voltages $U_{r1}$, $U_{r2}$ and $U_{r3}$ from the three commutation voltages, that is the main voltages $U_{tr}$, $U_{rs}$, $U_{st}$, between the phase conductors R, S, T in FIG. 1. The first of these saw-tooth voltages is shown in FIG. 3.

The ramp-function generator consists of an amplifier A1 with capacitive feedback C1, the amplifier thus operating as an integrator. A supply voltage $U_{ref}$ is connected to the amplifier input over a resistor R1. The voltage $U_{ref}$ may be a constant voltage or it can be made proportional to the frequency of the AC network, the delay angle then being measured in electrical degrees instead of pure time.

The amplifier A1 is parallel-connected with a transistor T1 controlled by a monostable flip-flop device M1 which is controlled by the commutation voltage $U_{tr}$ in such a way that the device switches over and short-circuits A1 over T1 when the commutation voltage passes through zero. The output voltage $U_{r1}$ from A1 thus acquires the saw-tooth shape shown in FIG. 3 with a period of a length equal to half a period of the commutation voltage. The righthand side of FIG. 2 forms sensing and holding circuits for the angle measuring device.

The output from 11 is connected over a resistor R4 and a contact S1 to an amplifier A4 of the voltage-follower type. A capacitor C4 is connected over a resistor R7 to the input on A4 and over the contact S4 to the output on A4. The contacts S1 and S4 are both controlled by the signal $U_{m4}$ from a flip-flop device which is in turn controlled by the short pulses $g_1$ and $g_4$ generated when the rectifiers 1 and 4 fire. These signals are indicated in the third row in FIG. 3. This means that, when one of the rectifiers 1 and 4 fires, the contacts S1 and S4 close briefly, whereupon the capacitor C4 is charged up to the actual output voltage from A1. This voltage is an unequivocal measurement of the corresponding delay angle. More specifically, in the curve $U_{r1}$ in FIG. 3, the abscissa constitutes the phase angle while the ordinate is the output voltage from A1. When the pulses $g_1$ or $g_4$ in FIG. 3 have ceased and the contacts S1 and S4 have opened, the output signal $U_\alpha$ from A4 will correspond to the charging voltage $U_{c4}$ in the capacitor C4 and will therefore be a measurement of the latest delay angle, that is for the rectifier most recently fired.

For the two other rectifier phases 3, 6 and 5, 2 in FIG. 1, corresponding ramp-function generators 12 and 13 are connected to the amplifier A4 over contacts S2 and S3 controlled by flip-flop devices M5 and M6 controlled by the control pulses $g_3$, $g_6$ and $g_5$, $g_2$, respectively. The contact S4 is affected by all the signals $U_{m4}$, $U_{m5}$, $U_{m6}$ so that the delay angles from each of the rectifiers 1 – 6 in FIG. 1 are recorded in the capacitor C4 and the amplifier A4. The output voltage $U_\alpha$ thus acquires the step-shape shown in the fourth row in FIG. 3, the length of the step corresponding to the conducting interval for the corresponding rectifier whereas the height indicates the delay angle.

If the delay angle for a single rectifier 1 – 6 is to be recorded, this can be done by simply disconnecting the control pulses g in FIG. 2 from the other rectifiers so that only the control pulses from the rectifier under observation will reach the corresponding flip-flop device M4, M5 and M6.

By supplying the signal from A4 in FIG. 2 to a capacitive circuit, the signal $U_\alpha$ will come to represent an average value for a number of sucessive delay angles. Another possibility is to record the maximum or minimum value of the delay angle over a certain period.

Figure 4:
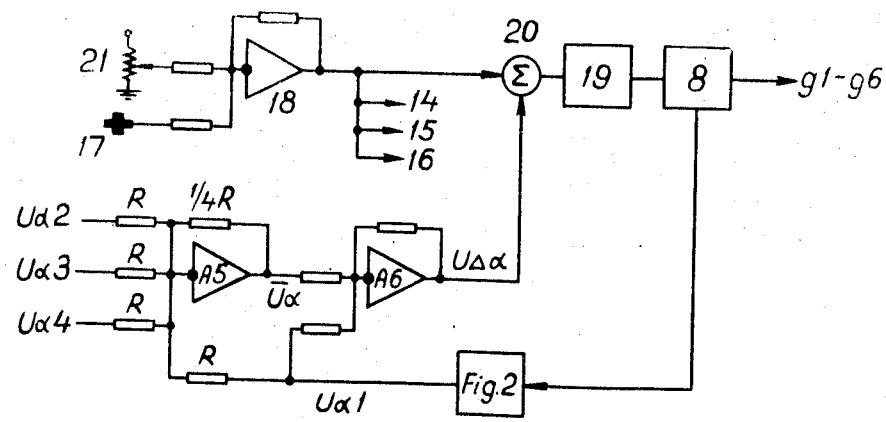
FIG. 4 shows how the device according to the invention can be used to balance a number of cooperating converters in relation to each other.

The device according to FIG. 2 can be used to control a tap changer or purely for inspection purposes to see how the converter is operating or it may be included in the control arrangements to balance two series-connected converters in relation to each other, as shown in FIG. 4.

As mentioned earlier, no exact measure of the relevant delay angle exists in the case of oscillator control of converters and if, for example, there are two series-connected converters in a converter station, controlled by a common regulator, the two converters may very well operate with widely differing delay angles so that these converters, carrying the same current, operate with completely different direct voltages and thus different loads. With only two converters it is possible to compare the phase positions of the control pulses of the two converters and if necessary adjust the control pulses in relation to each other. However, with several converters, such a pairwise comparison becomes rather complicated and it is therefore proposed to obtain the average value of the delay angles measured by the device shown in FIG. 2.

FIG. 1 also shows converters 14 – 16 series-connected to that described first and similar to it. The lower end of such a converter station may be connected to earth whereas the upper end is connected by the conductor 9 to a power transmission line. A measuring transducer 17 is connected in the earth connection to measure the direct current in the converters.

FIG. 4 shows how this measuring transducer is connected to a current control amplifier 18, common for the converters. A desired value for the direct current can be obtained from a desired-value emitter symbolically indicated by a potentiometer 21. The output signal from the control amplifier is supplied to a control system 19 with a control pulse generator 8 for each of the converters, also shown in FIG. 1.

The signals from 8 which are supplied to the rectifiers in the relevant converter are also supplied to a control angle measuring device according to FIG. 2 so that voltages $U_\alpha$ 1 – 4 are obtained as a measure of the delay angle in the various converters. The average value of these delay angles is then calculated in the amplifier A5 and compared for the individual converter in the amplifier A6 with the delay angle of the converter itself. Any deviation between the delay angle of the converter in question and said such average value is added in the form of an extra signal to the signal from the control amplifier 18 over a summation member 20, the delay angle of the converter then being adjusted to the average value for all the converters.

In this way all the converters will very quickly operate with the same delay angle and, even if there is an alteration in the delay angle caused by a control action in the control system, the delay angles will follow without any delay.

Because the delay angle itself is being measured all the time, it is irrelevant whether the converters operate in the same phase position or — as is usual with several converters in one station — whether they are phase-displaced with respect to each other. Furthermore, the device according to the invention operates without affecting the regulation of the converter in any other respect, which is of importance.

I claim:

1. In a converter arrangement for connection to an alternating current network (RST), said converter having rectifiers controlled by a control pulse device (8) ramp-function the form of an oscillator which delivers control pulses ($g_1$ – $g_6$) to the individual rectifiers, means for measuring the delay angle ($\alpha$) comprising a ramp-function generator (11–13) for each rectifier phase in the current converter connected to said alternating current network and including a timing device (M1) responsive to the passages through zero of the commutation voltages ($U_{tr}$, $U_{rs}$, $U_{st}$) derived from the network for the converter rectifiers, a sensing and holding circuit, a connecting member (S1 – S3) connecting said ramp-funtion generator to said sensing and holding circuit (A4, C4), said connecting member being controlled by the control pulse device of the current converter, so that the signal ($U_\alpha$) stored in said sensing and holding circuit at any moment corresponds to the delay angle for the rectifier last ignited.

2. In a converter arrangement as claimed in claim 1, there being for each ramp-function generator a sensing and holding circuit, the corresponding connecting member being controlled by corresponding outputs from the control pulse device of the current converter.

3. In a converter arrangement as claimed in claim 1 having at least two series-connected current converters (14–16), each converter being provided with such means for measuring the delay angle of the rectifiers and also with its own control system (18, 19), means (A5) to derive the average value of the delay angles ($\alpha_1-\alpha_4$) in all the converters and a comparison device (A6) in each converter to indicate the deviation of the delay angle of that particular converter from said means value, and means to supply this deviation in the form of an extra signal to the control system of the converter to correct its delay angle so that the delay angles in the various converters are of equal magnitude.

* * * * *